United States Patent [19]

Streich et al.

[11] 4,412,559
[45] Nov. 1, 1983

[54] DOG LOCKING SLEEVE

[75] Inventors: Steven G. Streich; R. Benton Nickles; Harold O. Treece, all of Duncan, Okla.

[73] Assignee: Halliburton Company, Duncan, Okla.

[21] Appl. No.: 396,990

[22] Filed: Jul. 9, 1982

Related U.S. Application Data

[63] Continuation of Ser. No. 194,316, Oct. 6, 1980, abandoned.

[51] Int. Cl.³ .................. F16L 55/12; F16L 55/10
[52] U.S. Cl. ..................... 138/89; 405/195; 405/203; 166/188; 166/192
[58] Field of Search ............... 138/89; 405/181, 183, 405/195, 203, 224, 227; 166/181, 188, 192, 135

[56] References Cited

U.S. PATENT DOCUMENTS

| | | | |
|---|---|---|---|
| 2,776,015 | 1/1957 | Bielstein | 138/89 X |
| 3,577,737 | 5/1971 | Burleson | 138/89 X |
| 4,142,371 | 3/1979 | Mayfield et al. | 138/89 X |
| 4,160,612 | 7/1979 | Britton et al. | |
| 4,178,967 | 12/1979 | Streich | 138/89 |
| 4,184,515 | 1/1980 | Streich et al. | 138/89 |
| 4,215,951 | 8/1980 | Knox | 138/89 |
| 4,262,702 | 4/1981 | Streich | 138/89 |

Primary Examiner—James E. Bryant, III
Attorney, Agent, or Firm—James R. Duzan; Thomas R. Weaver

[57] ABSTRACT

A retrievable plug having a dog locking sleeve which has extensions thereon to increase the effective axial length thereof to eliminate binding of the dog locking sleeve within the plug mandrel during actuation of the plug body for the removal of the plug body from the member in which it is installed.

4 Claims, 1 Drawing Figure

DOG LOCKING SLEEVE

This is a continuation of application Ser. No. 194,316, filed Oct. 6, 1980 now abandoned.

This invention relates to an improved reusable plug for sealing hollow cylindrical members, in particular, the jacket legs, pile sleeves, pilings, conductor pipes, or other similar members of offshore structures.

BACKGROUND OF THE INVENTION

Typically, when constructed, an offshore platform has the jacket legs sealed to prevent water leakage therein to facilitate towing operations and platform erection. With the jacket legs sealed against water leakage, the offshore platform may either be directly towed to the desired erection site or placed on barges and towed to the erection site. After being towed or transported by means of barges to the erection site, the offshore platform is positioned on the sea bottom by the controlled flooding of one or more of the jacket legs.

Sometimes, it is desirable to pre-install the piles, which are used to anchor the offshore platform to the floor of the body of water in which the platform is to be installed, in the jacket legs of the platform before the platform is transported to the erection site. When the piles are pre-installed in the jacket legs, they must also be sealed against water leakage thereinto.

One type of plug used to seal jacket legs, piles and conductor pipes of an offshore platform is described in U.S. Pat. No. 4,142,371. The plug comprises a steel cup retained within a cylindrical housing the same diameter as the jacket leg or member and is welded therein. The steel cup is retained within the cylindrical housing by means of a molded elastomeric member which has a portion of the cup retrieving cable spirally wrapped within the elastomeric member. To retrieve the cup from the jacket leg or member, a force is applied to the free end of the cable at the top of the jacket leg or member which, in turn, progressively rips the molded elastomeric member apart thereby freeing the steel cup to move upwardly in the jacket leg or member. However, since the plug and the housing must be installed in the jacket leg or member during the construction phase of the platform, any changes subsequent to the installation of the plug and housing which would affect the platform's weight distribution are undesirable to make because they would require relocation of the plug and housing in the jacket leg or member. Also, once the steel cup is removed from the jacket leg or member, since the cable embedded in the elastomeric material merely rips the elastomeric material apart, a residue of elastomeric material remains in the jacket leg or member which usually must be removed therefrom.

Another type of plug used to seal the jacket legs or other members of an offshore platform is an inflatable type plug having a plurality of slips or grippers engaging the jacket leg or member wall anchoring the plug in position by means of an inflatable member therebehind which also seals the interior of the jacket leg or member. An inflatable plug of this type has the disadvantages of the inflatable member rupturing or loosing inflation pressure, the inflation pressure may not be great enough to cause the slips or grippers to firmly engage the jacket leg or member to hold the plug in position, added equipment must be installed on the platform during towing operations to assure inflation pressure of the inflatable member is maintained and the jacket leg or member may be damaged by the slips or grippers engaged by the same.

Yet another type plug used to seal the jacket leg of an offshore platform is disclosed in U.S. Pat. No. 4,160,612. This type of plug is an inflatable type plug having adjustable locking dogs which engage an annular groove in a locking ring installed on the inside of the jacket leg. An inflatable plug of this type has the disadvantages of requiring a complex adjustment linkage for the locking dogs, the inflatable member may rupture or loose pressure, added equipment must be present to insure the inflation pressure of the inflatable packer is maintained, and a locking ring must be installed inside the jacket leg which may be particularly difficult if the locking ring is not concentric with the jacket leg.

Still yet another type of conductor pipe plug is illustrated in U.S. Pat. No. 4,184,515. This type of plug comprises central body member having elastomeric sealing means and pressure equalization means thereon installed in a cylindrical housing secured to a conductor pipe. The central body member of the plug is retained within the cylindrical housing by means of a plurality of shear pins. While this type of plug is simple to construct and use, for platforms installed in large depths of water the strength of the shear pins required to retain the central body member in the cylindrical housing becomes large requiring very large diameters of cables to be required connecting with the plug for removal from the conductor pipe.

Another type of conductor pipe plug is disclosed in U.S. Pat. No. 4,178,967. This type of plug comprises a central body member having elastomeric sealing means, pressure equalization means, and retractable release means thereon installed in a cylindrical housing secured to conductor pipe. The central body member of the plug is retained within the cylindrical housing by the retractable release means engaging an annular groove in the cylindrical housing. While this plug is simple to manufacture and use, since the retractable release means comprises a plurality of rod like members, each having the outer end thereof engaging the annular groove in the cylindrical housing, for platforms installed in very large depths of water the forces acting on the plug may be so great as to cause the ends of the retractable release means engaging the annular groove in the cylindrical housing to deform the annular groove locally, thereby making it difficult to release the plug during removal operations.

Another type plug is described in U.S. Pat. No. 2,776,015 and is used in plugging the tubing string in an oil or gas well. This plug comprises a plug body retained in tubing plug sub connected in a tubing string. The plug is retained in the sub by means of a plurality of spheres which engage an annular recess in the sub. Under high pressures, the spheres will be deformed into the annular recess in the sub making it difficult or impossible to release the plug from the sub. Also, the plug lacks a means of indicating when it is allowing fluid flow therethrough or is being released from the sub making it difficult to use.

Another yet different type plug used in offshore platforms is described in U.S. Pat. No. 3,577,737. This plug comprises a compressible rubber member retained between two discs having a central axially disposed rod running therethrough and an upper block assembly slidably receiving the rod therein having a plurality of retractable pins retaining the plug within the cylindrical member in which it is installed on the offshore platform.

This type of plug does not have a pressure equalization means and requires a large amount of elastomeric material for the compressible rubber member.

STATEMENT OF THE INVENTION

The retrievable plug of the present invention comprises an improved retrievable plug as described in U.S. Pat. No. 4,215,951. The improvement in the retrievable plug of the present invention comprises an improved dog locking sleeve.

In the manufacture of the retrievable plug described in U.S. Pat. No. 4,215,951 since the plug may have a very large diameter, the packer mandrel and dog locking sleeve are usually fabricated assemblies from plate material which has been rolled into the desired configuration. In this connection, since metal fabrication techniques lack precise dimensional control, unless the dog locking sleeve has a machined outer surface, the dog locking sleeve may not closely fit within the packer mandrel of the plug body thereby possibly causing the dog locking sleeve to cock and bind within the packer mandrel upon the actuation thereof.

Additionally, since the dog locking sleeve of the retrievable plug described in U.S. Pat. No. 4,215,951 has a comparatively short axial length and a low ratio of axial length to the external diameter thereof any uneven forces applied to the dog locking sleeve will cause or tend to cause the dog locking sleeve to cock and bind within the packer mandrel thereby possibly causing the locking dogs to remain in engagement with the locking ring secured within the jacket leg or similar member.

In contrast, the improved retrievable plug of the present invention comprises a retrievable plug having a dog locking sleeve which has extensions thereon to increase the effective axial length thereof to eliminate binding of the dog locking sleeve within the plug mandrel during actuation of the plug body for the removal of the plug body from the member in which it is installed.

DESCRIPTION OF THE INVENTION

Figure 1:
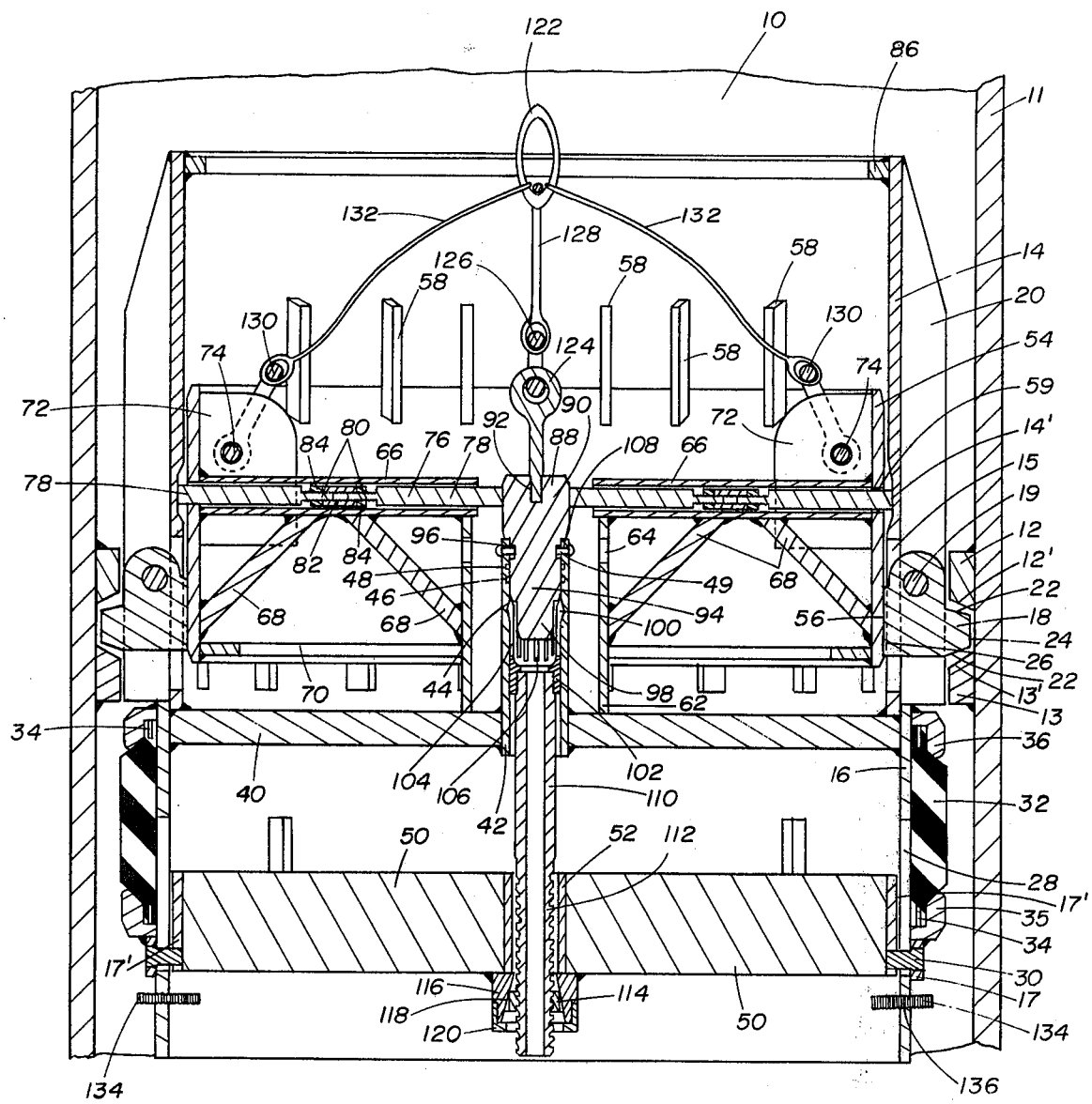
FIG. 1 is a cross-sectional view of the present invention.

Referring to FIG. 1, the present invention is shown in its perferred embodiment. The retrievable plug comprises a plug body 10 and plug body retaining means 12 and 13 which restrain the plug body 10 from movement after the installation thereof in a jacket leg 11, pile sleeve, pile, conductor pipe or other similar member of an offshore platform.

The plug body 10 comprises a packer mandrel, packer member 32, packer setting sleeve and locking dogs 18.

The packer mandrel is formed by cylindrical members 14 and 16 which are secured together by any suitable fastening means. The cylindrical member 14 has on the interior thereof an annular recess 14' and on the exterior thereof has a plurality of locking dogs 18 mounted thereon which extend inwardly through slots 15 and which mate with the plug body retaining means 12 and 13 thereby preventing axial movement of the plug body 10 in the jacket leg 11. Each locking dog 18 is pivotally attached to the cylindrical member 14 by means of a mounting pin 19 which, in turn, is attached to cylindrical member 14 by means of supports 20. Each locking dog 18 is formed with angular peripheral faces 22 which mate with a corresponding angular peripheral face 12' and 13' of the plug body retaining means 12 or 13, an outer peripheral face 24 and an inner peripheral face 26 which abuts dog locking sleeve 54.

The cylindrical member 16 is formed having a plurality of slots 28 therein which have, in turn, a plurality of pins 30 extending therethrough which pins secure the outer cylindrical member 17 and inner cylindrical member 17' of the packer setting sleeve together.

Located above outer cylindrical member 17 of the packer setting sleeve is packer member 32 which may be formed of any suitable elastomeric material. The packer member 32 is prevented from damage during compression and held in position by metal rings 34 which are mounted in the ends of the packer member 32. The packer member 32 is held in position against upward axial movement on the packer mandrel by means of annular ring 36 which abuts the metal ring 34 and the end of packer member 32 while the packer member 32 is held in position against downward axial movement on the packer mandrel by means of annular ring 35. The annular rings 35 and 36 are secured to the outer cylindrical members 16 and 17 respectively by any suitable means.

To seal the interior of the packer mandrel to prevent the flow of water therethrough a circular plug 40 is welded to cylindrical members 14 and 16. In the center of the plug 40 is a packer member releasing collet sleeve 42 having an annular collet recess 44, annular seal members 48 retained in annular seal cavities 46, and a plurality of threaded apetures 49 therein. Any suitable annular seal means may be used as annular seal members, such as O-ring type elastomeric seals. The packer member releasing collet sleeve 42 may be fastened to the plug 40 by any suitable fastening means.

A plurality of support members 50 are installed in the lower portion of the packer mandrel with their outer periphery secured to the inner diameter of the inner cylindrical member 18 of the packer setting sleeve. The support members 50 may be secured to inner cylindrical member 18 by any suitable means. A packer member setting mandrel 52 is located in the center of the plurality of support members 50 being secured thereto by any suitable means.

To hold the locking dogs 18 in engagement with the plug body retaining means 12 and 13 a dog locking sleeve 54 is installed in cylindrical member 14. The dog locking sleeve 54 is formed having an exterior surface 56. Concentrically located in the center of the dog locking sleeve 54 is the dog locking sleeve mandrel 62 having a plurality of apertures 64 therein. Radiating outwardly from the dog locking sleeve mandrel 62 and having one end secured thereto are a plurality of pin sleeves 66 which have the other end secured to the interior of the dog locking sleeve 54. The pin sleeves 66 are additionally secured to the dog locking sleeve mandrel 62 and dog locking sleeve 54 by means of reinforcing members 68. Secured within one end of the dog locking sleeve 54 is reinforcing ring 70 while secured intermediate the pin sleeves 66 and extending axially to the other end of the dog locking sleeve 54 are a plurality of attachment supports 72, each attachment support 72 having an aperture 74 therein. Located in between attachment supports 72 are dog locking sleeve extensions 58 which are secured to the dog locking sleeve 54 by any suitable means and which slidingly engage the interior of cylindrical member 14. The dog locking sleeve extensions 58 comprise a plurality of elongate members, each member having a portion thereof secured to the annular dog locking sleeve, the remaining portion extending beyond the annular dog locking sleeve means to slidably engage the interior of the packer mandrel, and a rectangular cross-sectional shape.

Contained within each of the pin sleeves 66 are adjustable dog locking pins 76. Each adjustable dog locking pin 76 comprises two end members 78 having threaded portions 80 thereon, internally threaded connector 82 which engages the threaded portions of end members 78 and locking nuts 84 which secure the end members 78 and connector 82 into an assembly by mating with the threaded portions of the end members 78 and abutting the ends of connector 82. The adjustable pins 76 have one end extending through the apertures 59 in the dog locking sleeve 54 engaging annular recess 14' in the cylindrical member 14 of the packer mandrel when the dog locking sleeve 54 is installed having first annular shoulder 56 abutting surfaces 26 of the locking dogs 18.

To retain the dog locking sleeve 54 within the cylindrical member 14 of the packer mandrel a retrieving lug 86 is secured to one end of the cylindrical member 14 by any suitable means.

To bias the dog locking pins 76 into engagement with annular recess 14' of the cylindrical member a pressure equalization plug 88 is positioned in packer member releasing collet sleeve 42 so that a portion of the plug 88 abuts the ends of the pins 76.

The pressure equalization plug 88 comprises an elongated cylindrical member having a first portion 90 which engages the ends of dog locking pins 76 having a threaded aperture 92 therein, having a second portion 94 having annular recess 96 therein which portion sealingly engages the interior of packer member releasing collet sleeve 42 and a third portion 98 which engages the enlarged ends 100 of packer member releasing collet 102.

Packer member releasing collet 102 is held in position in collet releasing sleeve 42 by means of the enlarged ends 100 of collet fingers 104 which are separated by spaces 106 mating with annular recess 44 in collet releasing sleeve 42. The third portion 98 of the pressure equalization plug 88 biases the enlarged ends 100 of collet fingers 104 into the annular recess 44 thereby preventing the removal of collet 102 from collet releasing sleeve 42 until the pressure equalization plug 88 is removed therefrom. To releasably retain the pressure equalization plug 88 within the collet releasing sleeve 42 a plurality of threaded shear pins 108 threadedly engage threaded apertures 49 in collet releasing sleeve 42 and extend into annular recess 96 in the second portion 94 of the pressure equalization plug 88.

The lower end of collet 102 is secured to the packer setting mandrel tube 110 by any suitable means, such as welding. The packer setting mandrel tube 110 is concentrically aligned with and passes through packer member setting mandrel 52 terminating exteriorly thereof. The lower end 112 of packer setting mandrel tube 110 is threaded to receive packer locking nut 114 thereon. Packer locking nut 114 is received in member 116 having conical bore 118 therein and cap 120 thereon which is suitably secured to packer setting mandrel 52 and support member 50.

As further shown in FIG. 1, a ring 122 is connected to plug eye 124 secured to pressure equalization plug 88 via ring 126 and cable 128 and is connected to attachment supports 72 via rings 130 and cables 132. The cables 132 are longer than cable 128 thereby allowing the pressure equalization plug 88 to be removed from packer member releasing collet sleeve 40 before any movement of dog locking sleeve 54 would occur. To center the plug body 10 within the jacket leg 11 a plurality of threaded members 134 which are threadedly received within threaded apertures 136 of cylindrical member 16 of the packer mandrel may be used.

To install the plug body 10 in a jacket leg 11, the plug body retaining means 12 and 13 are secured in position in the jacket leg 11. Subsequently, the plug body 10 is moved into position with the locking dogs 18 being contained between the plug body retaining means 12 and 13. To secure the plug body 10 in position in the jacket leg 11 the dog retaining sleeve 54 is positioned within the cylindrical member 14 of the packer mandrel having the first annular shoulder 56 abutting surfaces 26 of the locking dogs 18, the dog locking pins 76 are moved outwardly until their ends engage annular recess 14' of cylindrical member 14, the pressure equalization plug 88 is inserted into packer member releasing collet sleeve 42 having the third portion 98 of the plug 88 engaging packer releasing collet 102 and the threaded shear pin members 108 are installed in threaded apertures 49 of the sleeve 42 having their ends extending into annular recess 96 of plug 88 thereby releasing securing the plug 88 in position in the collet 102 by inserting the threaded shear pin members 108 through the openings formed between pin sleeves 66, into the annular space formed between the dog locking sleeve mandrel 62 and the packer member releasing collet sleeve 42 having plug 88 therein, and rotating the members 108 into threaded apertures 49. At this time, the plug body 10 is prevented from axial movement within jacket leg 11 by plug body retaining members 12 and 13, the locking dogs 18 are prevented from movement by dog locking sleeve 54, and the dog locking sleeve 54 is prevented from movement by the dog locking pins 76 having their ends engaging annular recess 14' of cylindrical member 14 and the first portion 90 of pressure equalization plug 88.

To compress the packer member 32 into engagement with jacket leg 11 a hydraulic jack or other device is attached to the threaded end portion 112 of packer setting mandrel tube 110 to apply sufficient force to the packer setting sleeve via cap 120, member 116, packer setting mandrel 52, supports 50, inner cylindrical member 17', pins 30 and outer cylindrical member 17 thereof to compress the packer member 32 to seal the annulus between the plug body 10 and jacket leg 11. During the packer setting process, the packer member 32 is compressed between annular rings 35 and 36. Once the packer member 32 is compressed to seal the annulus between the plug body 10 and jacket leg 11, the packer locking nut 114 is advanced to abut conical surface 118 of member 116 at which time the jack or other device may be removed from the threaded end portion 112 of the packer setting mandrel tube 110. The packer setting mandrel tube 110 is prevented from axial movement by being secured at its upper end by means of enlarged ends 100 of collet fingers 104 of collet 102 being trapped in the annular recess 44 of the collet sleeve 42 by the third portion 98 of the pressure equalization plug 88.

It should be noted that any forces applied from below the plug body 10 will set or compress the packer member 32 tighter in the annulus between the plug body 10 and jacket leg 11, that the axial loading of the plug body 10 is carried by plug body retaining means 12 and 13, and that any fluid entering the packer mandrel tube 47 is prevented from flowing through the plug body 10 by annular seals 48 engaging the second portion 94 of the pressure equalization plug 88.

To remove the plug body 10 from the jacket leg 11 after the packer member 32 has been compressed to seal the annulus between the plug body 10 and jacket leg 11, initially, a force is applied to a line (not shown) secured to ring 122 to shear threaded shear pin means 108 to allow the removal of the pressure equalization plug 88 from the collet sleeve 42 thereby allowing the collet 102 to be released therefrom which allows the packer member 32 to relax and disengage the jacket leg 11 and allowing fluid to flow through packer setting mandrel tube 110 and collet sleeve 42 and around the packer member 32 as it relaxes to equalize any fluid pressure differential across the plug body 10. At this point, although the pressure equalization plug 88 has been removed from the collet sleeve 42, since the cable 128 is of a shorter length than cables 132, the ends of dog locking pins 76 remain in engagement with annular recess 14' of cylindrical member 14 and the dog locking sleeve 54 has first annular shoulder 56 abutting surfaces 26 of locking dogs 18 thereby maintaining the locking dogs 18 in engagement with plug body retaining means 12 and 13. After any fluid pressure differential has been equalized across plug body 10 and after the packer member 32 has had a sufficient time to relax, disengage the jacket leg 11 and return to diameter which will allow it to pass through the plug body retaining means 12 and 13, a second force is applied to a line connected to ring 122 to cause the dog locking sleeve 54 to move within cylindrical member 14 until it abuts retrieving lug 86 at which time the locking dogs 18 are free to pivot about mounting pins 19 inwardly through slots 15 and disengage plug body retaining means 12 and 13 thereby allowing the plug body 10 to be moved through the jacket leg 11 and out the end thereof.

If during the application of the second force to the ring 122 to remove the dog locking sleeve 54 within cylindrical member 14 to a position where it abuts retrieving lug 86 excessive clearance is present between the dog locking sleeve 54 and the interior of cylindrical member 14 and/or the dog locking sleeve 54 has a relatively short axial length in relation to the external diameter thereof, the dog locking sleeve 54 may bind within the cylindrical member 14 in a position where the dog locking sleeve 54 has a portion thereof engaging surfaces 26 of the locking dogs 18 thereby preventing the removal of plug body 10 from the jacket leg 11. While it is possible to closely control the clearance between the dog locking sleeve 54 and the interior of cylindrical member 14 by machining the exterior of the dog locking sleeve 54 and the interior of the cylindrical member 14, the machining of two large diameter parts to close dimensional tolerances is time consuming, hence expensive.

In the plug body 10 of the present invention the problem of binding of the locking sleeve 54 within the cylindrical member 14 is effectively eliminated by utilizing a dog locking sleeve having extensions thereon to increase the effective axial length thereof. The dog locking sleeve 54 is formed having extensions thereon to have a ratio of axial length to the external diameter thereof of greater than approximately 0.3. By increasing the axial length of the dog locking sleeve 54 any effect of uneven forces which are applied to the dog locking sleeve 54 to move the sleeve 54 within the cylindrical member 14 which tend to cause the sleeve to cock and bind within the member 14 is minimized.

From the foregoing it can be seen that the retrievable plug of the present invention clearly contains improvements not described in the prior art plugs.

Having thus described my invention, I claim:

1. A removable plug for temporarily sealing the interior of an annular member to prevent the flow of fluid therethrough, said removable plug comprising:

plug body means adapted to be disposed within said annular member, the plug body means comprising:
   packer mandrel means having a plurality of apertures therein and having a plug therein for preventing the flow of said fluid therethrough, the plug having a centrally located sleeve therein;
   packer member means located on the packer mandrel means for sealingly engaging the interior of said annular member;
   packer setting sleeve means located on the packer mandrel means for compressing the packer member means into sealing engagement with the interior of said annular member;
   locking dog means pivotally mounted on the packer mandrel means for retaining said plug from axial movement when installed in said annular member, the locking dog means comprising:
   a plurality of members pivotally mounted on the packer mandrel means, each member having a portion thereof adapted to engage a portion of the interior of said annular member when said plug is installed therein and being rotatable through an aperture of the plurality of apertures in the packer mandrel means;
pressure equalization means releasably secured within the centrally located sleeve of the packer mandrel for allowing the flow of said fluid through said plug when said plug is installed in said annular member thereby allowing the pressure of said fluid to substantially equalize in said annular member and across said plug before the removal of said plug from said annular member;
annular dog locking sleeve means slidable within the packer mandrel means between a first position wherein the locking dog means abut a portion of the exterior surface of the dog locking sleeve means thereby preventing rotation of the locking dog means through the apertures in the packer mandrel means and a second position wherein the locking dog means are free to rotate through the apertures in the packer mandrel means thereby disengaging the interior of said annular member when said plug is installed therein to allow the removal of said plug from said annular member; and
dog locking sleeve extension means secured to one end of the annular dog locking sleeve means, the dog locking sleeve extension means adapted to slidably engage the interior of the packer mandrel means, the dog locking sleeve extension means comprising:
   a plurality of elongate members, each member having a portion thereof secured to the annular dog locking sleeve means and the remaining portion extending beyond the annular dog locking sleeve means to slidably engage the interior of the packer mandrel means such that the combination of the annular dog locking sleeve means and dog locking sleeve extension means has a ratio of axial length to the diameter of the exterior surface of the dog locking sleeve means of greater than approximately 0.3.

2. The removable plug of claim 1 wherein each elongate member of the dog locking sleeve extension means comprises:
an elongate member having a rectangular cross-sectional shape.

3. A removable plug for temporarily sealing the interior of an annular member to prevent the flow of fluid therethrough, said removable plug including annular packer mandrel means and annular dog locking sleeve means, wherein the improvement in said removable plug comprises:
dog locking sleeve extension means secured to one end of the annular dog locking sleeve means, the dog locking sleeve extension means adapted to slidably engage the interior of the packer mandrel means, the dog locking sleeve extension means comprising:
a plurality of elongate members, each member having a portion thereof secured to the annular dog locking sleeve means and the remaining portion extending beyond
the annular dog locking sleeve means to slidably engage the interior of the packer mandrel means wherein the combination of the annular dog locking sleeve means and dog locking sleeve extension means has a ratio of axial length to the diameter of the exterior surface of the dog locking sleeve means of greater than approximately 0.3.

4. The removable plug of claim 3 wherein each elongate member of the dog locking sleeve extension means comprises:
an elongate member having a rectangular cross-sectional shape.

* * * * *